April 1, 1952 F. W. REUTER 2,590,891
CASSETT
Filed Aug. 3, 1950 2 SHEETS—SHEET 1
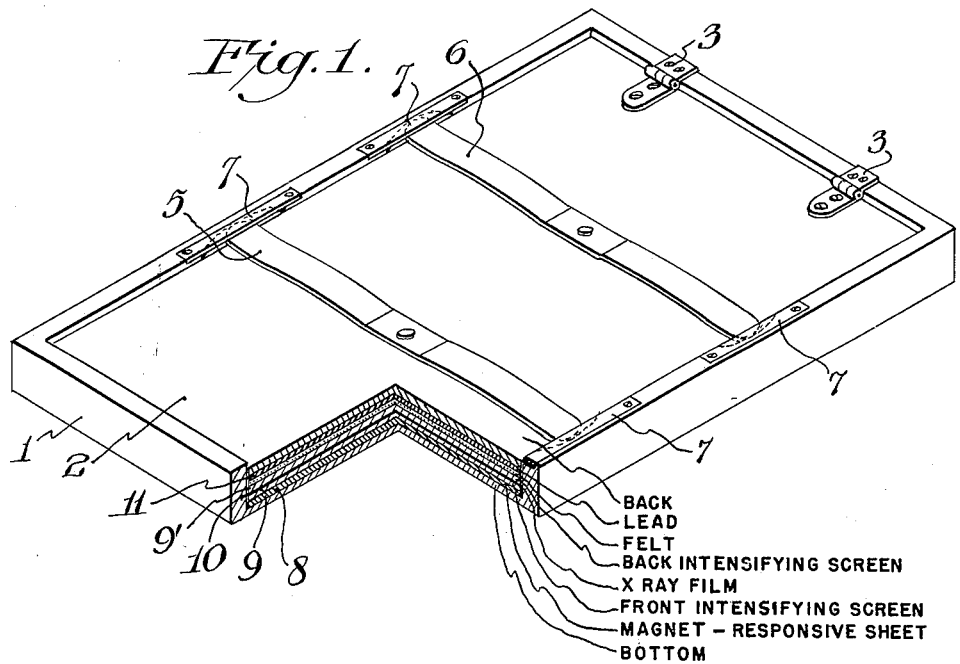
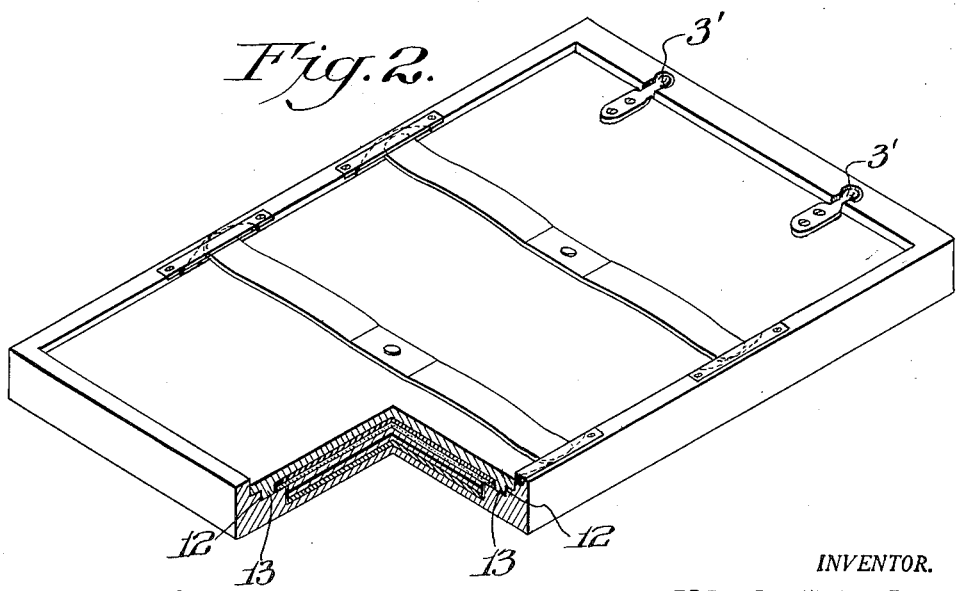
INVENTOR.
FREDERIC W. REUTER
BY
Lynn Barrett Morris
ATTORNEY April 1, 1952 F. W. REUTER 2,590,891
CASSETT
Filed Aug. 3, 1950 2 SHEETS—SHEET 2
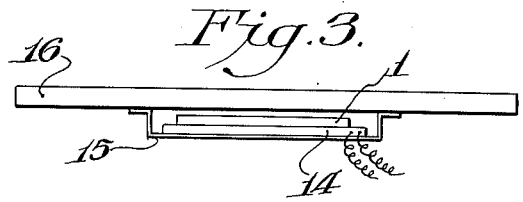
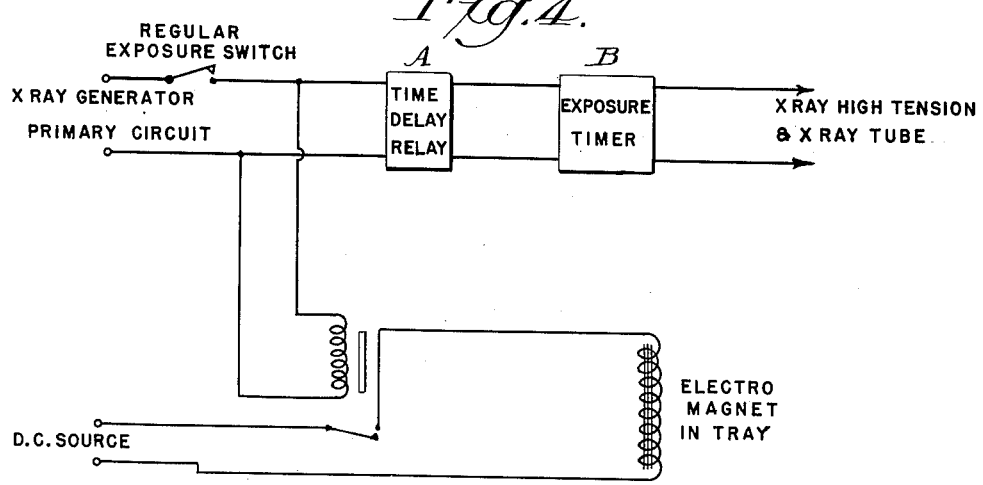
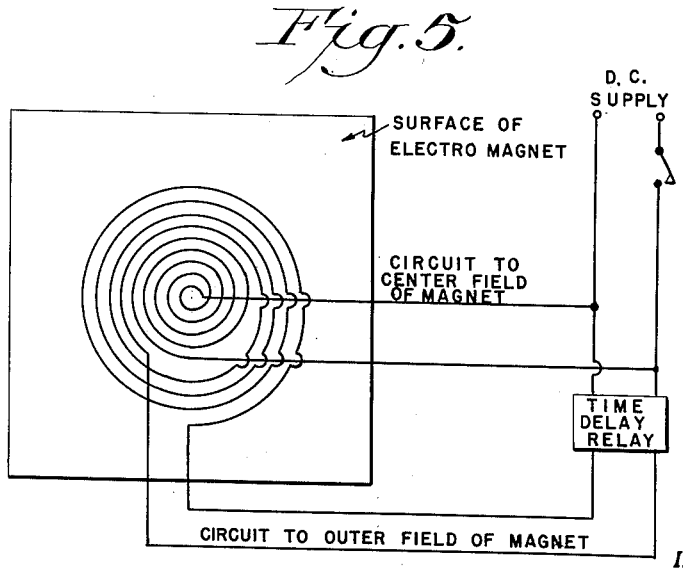
INVENTOR.
FREDERIC W. REUTER
BY
Lynn Barratt Morris
ATTORNEY Patented Apr. 1, 1952

2,590,891

UNITED STATES PATENT OFFICE 2,590,891

CASSETTE

Frederic W. Reuter, Towanda, Pa.

Application August 3, 1950, Serial No. 177,385

6 Claims. (Cl. 250—68)

1

This invention relates to improvements in cassettes and more particularly to a cassette which will provide uniform contact between a fluorescent screen surface and the light-sensitive layer of a photographic film. Still more particularly it relates to an X-ray cassette which has a magnet responsive element that provides uniform contact between a fluorescent screen and an X-ray sensitive film element.

Cassettes are used for making radiographs or X-ray photographs and they are generally designed so that they will accommodate in addition to the photographic film, or films a fluorescent screen or screens which are excited by X-rays and intensify the latent image produced in the film by an X-ray exposure. The cassettes generally consist of a lightproof, shallow box with a hinged or removable back. The front of the cassette is generally thin and made of metal or a plastic material which are not strongly absorptive of X-rays. Generally, a felt pad or lining is placed on the inside of the back and latched springs are provided on the outside of the back so that firm contact will be maintained between the fluorescent screen and the light-sensitive film element. Such cassettes have the disadvantage that the frame and front become warped and/or the felt backing pad becomes worn and good uniform contact between the screen and film cannot be maintained.

Cassettes have been made with pneumatic bags which are either loosely placed between the back or front and the assembled X-ray intensifying screen or is affixed to the screen or back or front of the cassette. The pneumatic bags have various disadvantages in that the air leaks out and they are subject to rupture due to improper handling and become loose and buckle whereby non-uniform contact is obtained.

An object of this invention is to provide a simple and effective means for improving contact between an X-ray intensifying screen and an X-ray sensitive film in a cassette. A further object is to provide such a means which can be used in the conventional types of cassettes. Another object is to provide a new type of cassette which is light in weight but strong and provides adequate contact between the X-ray intensifying screen and light-sensitive film. Still other objects will be apparent from the following description of the invention.

This invention in its broadest aspect consists of a cassette having a body member permeable to X-rays and a cover member and a thin sheet of a magnetizable metal mounted in said cassette

2 which has an area slightly less than that of the body of the cassette so it is freely movable from front to back. The metal sheet is placed in front of an X-ray intensifying screen which is disposed in front of the light-sensitive surface of an X-ray film element so that the incident X-rays passing through the object field will pass through the sheet and X-ray intensifying screen and expose the X-ray film. The sheet of magnetizable metal is placed in the cassette for the purpose of providing intimate contact between the X-ray intensifying screen and the X-ray film element. In operation a magnet is placed adjacent the back surface of the cassette and energized just prior to the exposure. The sheet of magnetizable metal is drawn toward the magnet and since the X-ray intensifying screen and cassette are between it and the magnetic field they are brought into uniform contact during the X-ray exposure.

The invention will be further illustrated with reference to the accompanying drawing which constitutes a part of this specification wherein:

Fig. 1 is a perspective view with parts in section of a loaded cassette showing the magnet-responsive element;

Fig. 2 is a perspective view with parts in section of a modified cassette containing a magnet-responsive element;

Fig. 3 is a sectional view of a radiographic table with the cassette in operative association with an electromagnet;

Fig. 4 shows an electrical circuit for operating the cassette; and

Fig. 5 shows an additional electrical circuit and apparatus for operating the cassette.

Referring now to the drawings, the cassette consists of a shallow, rectangular box body 1 which has a cover 2 hinged at one end with hinges 3 or 3'. The cover is provided with two pivoted spring pressure clamps 5 and 6 which latch under metal plates 7 which are fastened to the sides of the box body in any suitable manner, e. g., by bolts, screws, rivets, etc. The inside of the hinged cover and the inside bottom of the cassette may be lined with felt as shown. A sheet of lead or other material which will not transmit X-rays is disposed between the felt lining and the inside surface of the cover. The cassette is provided with a sheet 8 of magnet-responsive metal which loosely fits in the cassette. An X-ray intensifying screen 9 is placed on top of the magnet-responsive sheet. Next there is placed a sheet of X-ray film 10 which has a light-sensitive surface on each side of the film base. Another X-ray intensifying screen 9' is then placed on top of the film. The latter screen may be glued to the felt lining on the cover if desired. In practice, the lower screen may be glued to the magnet-responsive sheet. The loaded cassette is subjected to the influence of a magnetic field just prior to and during an X-ray exposure. The magnetic field pulls the magnet-responsive sheet into firm, uniform contact with the lower X-ray intensifying screen, which, in turn, is firmly pressed into uniform contact with the light-sensitive surface of the film element.

The cassette shown in Fig. 2 is similar to that of Fig. 1, but has a light-locking channel 12 disposed around the inner walls of the box-body. The cover is provided with a bead 13 which extends around the cover near its edges and fits into the groove when the cassette is in closed, loaded condition. The remaining features of the cassette are the same as those shown in Fig. 1 and the cassette operates in the same way.

The box-body may be made of aluminum, wood, or a synthetic plastic or resin, e. g., phenol-formaldehyde, polymethyl methacrylate, polystyrene, polyvinyl chloride or a superpolymer, e. g., ethyl cellulose, nylon. The frame may be of substantial thickness but the bottom or exposure front of the cassette should be relatively thin so it is permeable to X-rays.

As shown in Fig. 3 the novel cassettes of this invention are used in the conventional manner except that a magnetic field is provided adjacent the back surface of the cassette. In this figure an electromagnet 14 having a field area coextensive with or larger than the area of the magnet-responsive member is placed in tray 15 and the cassette is placed on top of said magnet. The tray is fastened on the bottom of table 16.

The magnet-responsive metal sheet may be composed of any metal including an alloy which is attracted to a magnet, e. g., iron, steel and nickel, alloys of such metals and other alloys, e. g., aluminum-nickel-cobalt. The sheet should be relatively thin so that it does not stop the passage of X-rays. An annealed iron sheet of 0.002 inch thickness, for example, has been found to be satisfactory.

In Fig. 4 there is shown a suitable circuit for energizing the magnet and forcing the X-ray intensifying screen or screens into intimate uniform contact with the light-sensitive film element prior to and during the X-ray exposure. A circuit for energizing the magnet is included in the circuit for energizing the X-ray tube. A time delay relay is provided in the circuit to the exposure timer to insure energizing of the magnet before exposure.

In Fig. 5 there is shown an apparatus in circuit for energizing the central area of a flat electromagnet and subsequently energizing an outer circumferential area of the electromagnet. The two circuits for energizing the central area and the circumferential area are in the circuit which energizes the X-ray tube. The circuit is provided with time delay relays so that the central area of the electromagnet is first energized then the circumferential area is energized and finally the circuit for operating the X-ray tube is energized. This apparatus and electrical circuit has the advantage that air is not trapped between the screens and the photographic film element thus causing poor detail in the resulting radiograph. By first energizing the central area of the electromagnet the magnet responsive sheet is firmly pressed against the screen in its central part. The air is forced out of the central part and upon energizing of the circumferential area of the magnet this air is forced out toward the edges of the X-ray intensifying screen, thus enabling one to have uniform contact throughout the entire screen surface.

The invention is, of course, not limited to any particular construction of cassette since the novel magnet-responsive metal sheet can be placed in practically any type as long as the sheet has slightly less area than that of the cassette.

An advantage of the invention is that it provides a simple yet effective cassette which provides good and uniform contact between an X-ray intensifying screen and an X-ray film. Another advantage is that the conventional cassettes can be readily modified to admit the novel magnet-responsive sheet. A further advantage is that the cassettes can be made of much lighter materials with smaller frames, etc.

As many widely different embodiments of this invention can be made without departing from the spirit and scope thereof, it is to be understood that the invention is not to be limited except as defined by the claims.

What is claimed is:

1. An X-ray film cassette comprising in combination a light-proof, flat, rectangular box body member which is permeable to X-rays, a light-proof, interfitting, cover member having a stratum impermeable to X-rays, said body member being adapted to receive an X-ray intensifying screen and a light-sensitive film element, a rectangular sheet of magnet-responsive metal in the cassette which is of such thickness that it is permeable to X-rays having an area slightly less than that of the box body so that it may freely move toward and away from the cover and means for fastening the cover to the body.

2. An X-ray film cassette comprising in combination a light-proof, flat, rectangular box body member the front surface of which is permeable to X-rays, a light-proof, interfitting, cover member carrying a lead sheet and a layer of felt, said body member being adapted to receive an X-ray intensifying screen and a light-sensitive film element, a thin ferrous metal sheet of such thickness that it is permeable to X-rays having an area slightly less than that of the box body so that it may freely move toward and away from the cover, and means for fastening the cover to the body.

3. An X-ray film cassette comprising in combination, a light-proof, flat rectangular box body member having a channel around its periphery the front surface of which is permeable to X-rays, a light-proof, interfitting, hinged cover member having a bead around its periphery near the edges which fits into said groove in the body and carrying a lead sheet and layer of felt, said body member being adapted to receive an X-ray intensifying screen and a light-sensitive film element, a thin ferrous metal sheet mounted in the bottom of the box body of such thickness that it is permeable to X-rays having an area slightly less than that of the box body so that it may freely move toward and away from the cover, pivoted springs on said cover and latch grooves on said body for holding the cover in closed position on said body member.

4. The process of making an X-ray exposure which comprises subjecting an X-ray film cassette of the type defined in claim 1 which contains an X-ray intensifying screen and a light-sensitive film element to the action of a plurality of radially disposed magnetic fields which are energized successively at the center and then radially and just prior to an exposure of said loaded cassette to X-rays.

5. A process as set forth in claim 4 wherein the electrical circuit for energizing the magnetic field is in the same circuit for effecting the exposure to X-rays.

6. The process of making an X-ray exposure which comprises subjecting an X-ray film, adjacent X-ray intensifying screen and a separate magnet-responsive sheet permeable to X-rays which are in juxtaposition in a cassette with said sheet nearest a source of X-rays to the action of a plurality of magnetic fields radially disposed about a central magnetic field which fields are disposed behind said film, by first energizing the central magnetic field and then successively energizing the outer fields in a radial manner and then exposing said film to X-rays through said sheet while the sheet is subjected to the action of the magnetic fields.

FREDERIC W. REUTER.

REFERENCES CITED

The following references are of record in the file of this patent:

UNITED STATES PATENTS

| Number | Name | Date |
|---|---|---|
| 1,166,797 | White | Jan. 4, 1916 |
| 1,213,208 | Kelley | Jan. 23, 1917 |
| 2,530,321 | Armstrong | Nov. 14, 1950 |